United States Patent [19]
Berglund et al.

[11] Patent Number: 6,098,893
[45] Date of Patent: Aug. 8, 2000

[54] COMFORT CONTROL SYSTEM INCORPORATING WEATHER FORECAST DATA AND A METHOD FOR OPERATING SUCH A SYSTEM

[75] Inventors: Ulf Stefan Berglund, Dalsjofors; Bjorn Henry Lundberg, Boras, both of Sweden

[73] Assignee: Honeywell Inc., Minneapolis, Minn.

[21] Appl. No.: 09/176,998

[22] Filed: Oct. 22, 1998

[51] Int. Cl.[7] ................................................. G05D 23/00
[52] U.S. Cl. ............................................. 236/51; 700/276
[58] Field of Search ........................... 236/51, 16, 49.1; 700/276, 277, 278

Primary Examiner—Henry Bennett
Assistant Examiner—Marc Norman
Attorney, Agent, or Firm—Robert B. Leonard

[57] ABSTRACT

In a comfort controls system for multiple buildings (whether residential, commercial or industrial), a weather forecast unit sends weather forecast data over the Internet to a building management provider which handles building management services for a number of clients, each having a number of buildings and properties.

At the provider's reception station, data on the external-building characteristics of all the buildings are compiled with the received data and then fed to the appropriate building management controls system.

20 Claims, 2 Drawing Sheets

COMFORT CONTROL SYSTEM INCORPORATING WEATHER FORECAST DATA AND A METHOD FOR OPERATING SUCH A SYSTEM

FIELD OF THE INVENTION

The present invention relates to a comfort control system for one or more buildings and to a method of operating a comfort control system. The present invention also relates to a computer program for operating a comfort control system and to electronic distribution of such a computer program.

BACKGROUND OF THE INVENTION

U.S. patent Specification No. 4,775,944 describes a control system for air conditioning and/or hot water supplying apparatus using a central heat source which supplies cooling or heating to a plurality of dwelling units of a congregated or multi-storied house. The system includes a database which stores data for forecasting weather or atmospheric phenomena near the multi-storied house on the basis of the data from a weather information sensor. Thus, while such a database may provide a useful record of what weather has previously occurred (during the existence of the database) in the immediate local vicinity, it inevitably has limited data of weather conditions on which to call, and the prediction techniques and expertise are unsophisticated, typically relying on trying to provide a close fit between prevailing weather conditions and what can be found in the database.

For a number of years, various national meteorological organisations have provided detailed weather forecast information to companies in order to assist them in handling their commercial activities, for example, agriculture or powerstations. Typically, the weather forecast information is used merely to time harvesting or to vary the output of, for example, the power-station.

OBJECTS OF THE INVENTION

An object of the invention is to provide a system, and method of operation, for comfort control of buildings involving weather forecast information and suited for use over a wide geographical area.

An object of the present invention is to provide a system, and method of operation, which utilises weather forecasting data from experienced meteorologists or otherwise suitably qualified people.

An object of the present invention is to provide a system, and method of operation, which utilises information based on prevailing weather conditions over a wide geographical area, for example thereby providing the ability to track moving weather-fronts over a wide geographical area.

An object of the present invention is to provide a system, and method of operation, which is able to include within the scope of its predictions, weather conditions which are extreme and/or rare, rather than predictions which are limited merely to weather conditions previously recorded or noted by the system.

An object of the present invention is to provide a system, and method of operation, which controls efficiently and effectively the energy requirement of a building in accordance with changes in the weather.

An object of the present invention is to provide a system, and a method of operation, which achieve better indoor climate.

An object of the present invention is to provide a system, and a method of operation, which contributes to reducing the emission of greenhouse gases, and/or acidifying substances which pollute the environment.

An object of the present invention is to provide a system and a method of operation, whereby the weather forecast data is used for pro-active and anticipatory operation of the building controls.

SUMMARY OF THE PRESENT INVENTION

The present invention is a comfort controls system for at least one building that considers a number of building external factors in producing control instructions. The invention includes structure for receiving weather forecast data, structure for combining the data with a group of external-building characteristics relating to at least one specific building to derive instructions signals for comfort controls operation of at least the one specific building; structure for directing the instructing signals to the building management control means for the appropriate specific building(s).

The present invention may provide any one or more of the following features:

external-building characteristics include at least one of the following parameters:
  i. the height of the building;
  ii. the cross-sectional profile of the building from each of a plurality of directions relative to the building;
  iii. the exterior cross-sectional shape of the building;
  iv. the flow/drag characteristics over the exterior of the building for each of a number of directions of flow, both in horizontal planes at a number of heights from the ground and in non-horizontal planes;
  v. the degree of shelter afforded by adjacent buildings or other structures relative to each of a plurality of directions of approach to the building;
  vi. the degree of shelter or exposure afforded by the surrounding land-mass relative to each of a plurality of directions of approach to the building.

The structure for receiving the weather forecasting data may is receive the data in one of the following formats:
  i. signals transmitted over the Internet
  ii. radio-transmitted signals
  iii. signals transferred over a hard-wire network.

The structure for transferring the instructing signals to the building management control system may do so in one of the following formats:
  i. signals transmitted over the Internet
  ii. radio-transmitted signals
  iii. signals transferred over a hard-wire network.

The building management system includes at least one controller capable of changing the environmental condition such as temperature within the building. The controller could be a heating controller which operates the heating functions in accordance with the weather forecast data received in order to optimise the interior temperature while maximising use of the radiant input energy. The building management control system may also or instead include a cooling controller which operates the cooling functions in accordance with the weather forecast data in order to optimise the storage of thermal means in the building. Alternatively, the controller may a be ventilation controller which operates the ventilation functions in accordance with said weather forecast data in order to optimise the heating or cooling requirements of the building.

The system may also include a checking device that checks to ensure that the instruction signals received at the controller includes data for the respective building. This may be done by comparing the building characteristics contained in the instruction signal with a store containing building parameters for that specific building.

The present invention also provides a method of operating a comfort controls system for at least one building, the method including the steps of:

receiving weather forecast data;

combining the data with a group of external-building characteristics relating to at least one specific building to derive instructions signals for comfort controls operation of the at least one specific building;

directing the instructions signals to the building management control means for the appropriate specific building(s).

In a preferred embodiment, the invention also includes apparatus for the control of at least one comfort controls system, the apparatus comprising a weather forecaster providing weather forecast data, a processor for deriving an "equivalent temperature characteristic" for one or more building types and based on one or more elements of said weather forecast data, the processor for developing the "equivalent temperature characteristic" capable of deriving instruction signals for comfort controls operation of said at least one specific building; and communications devices to direct the instruction signals to the building management control means for the appropriate specific building(s).

The present invention may also includes a computer program product directly loadable into the internal memory of a digital computer, comprising software code portions for performing the steps of a method of the present invention when said product is run on a computer.

BRIEF DESCRIPTION OF THE DRAWING

In order that the present invention may more readily be understood, a description is now given, by way of example only, reference being made to the accompanying figures, in which.

DETAILED DESCRIPTION OF THE PREFERRED EMBODIMENT

Figure 1:
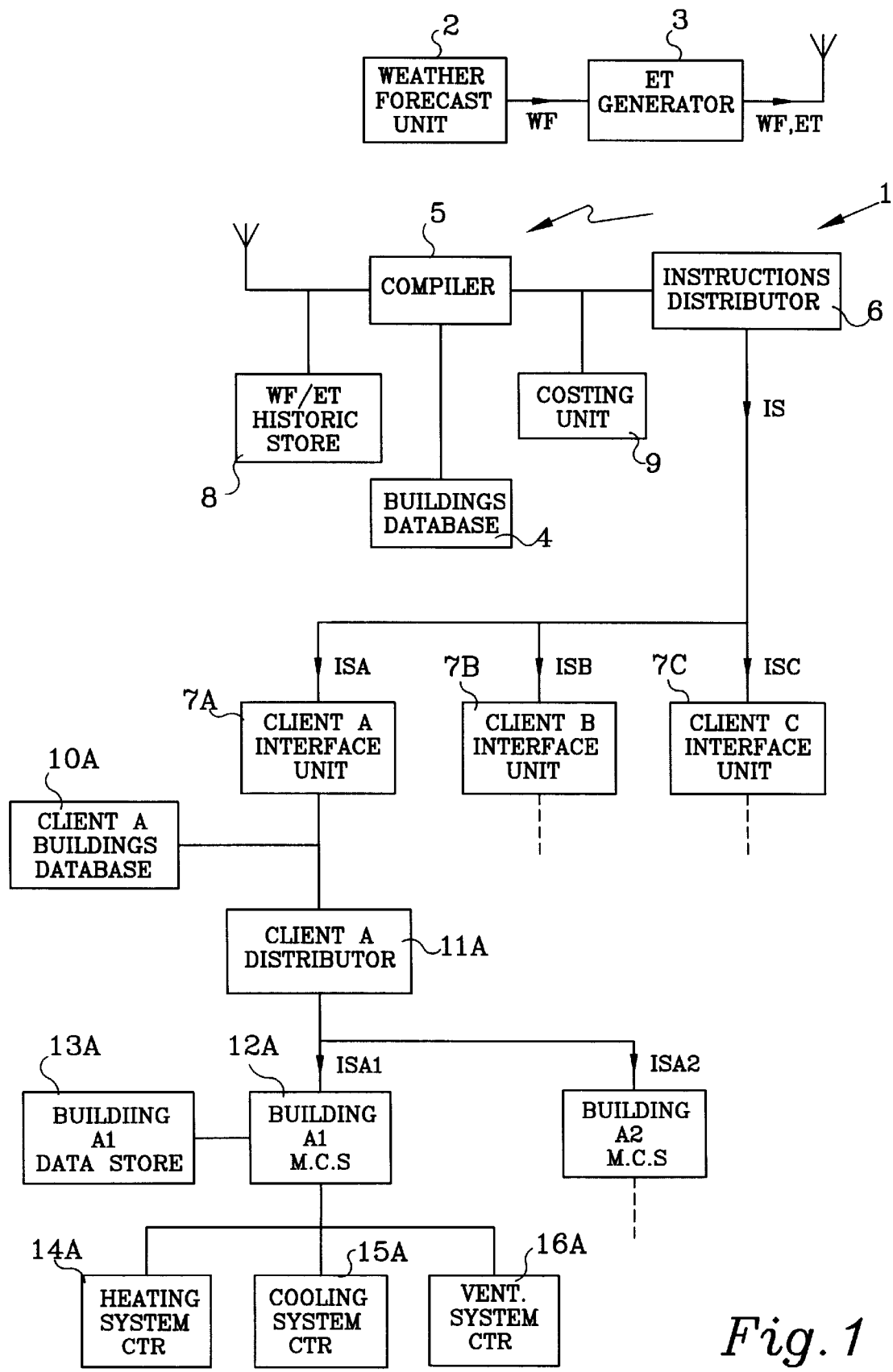
FIG. 1 is a block schematic drawing of a comfort controls system embodying the present invention.
Figure 2:
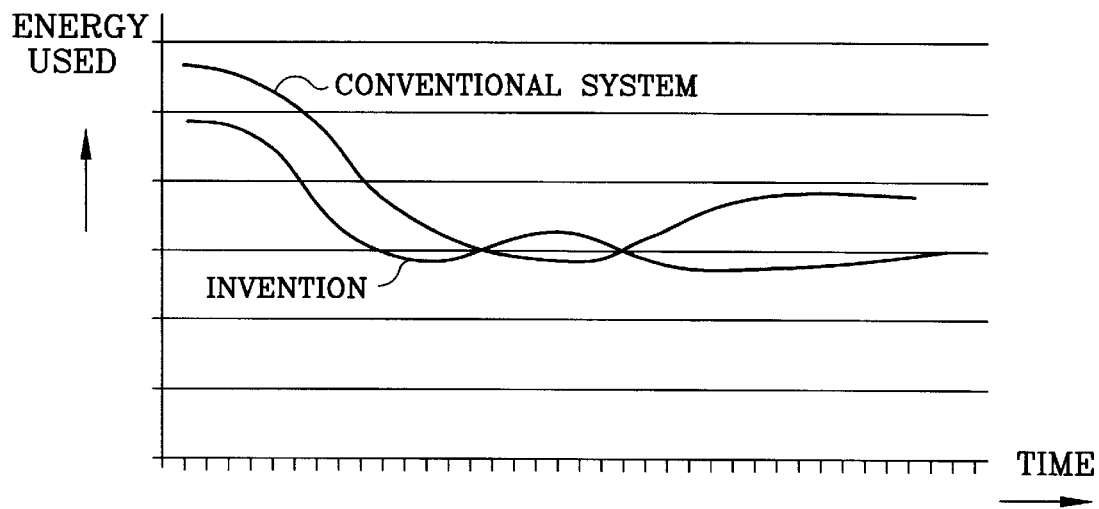
FIG. 2 is a graph showing the benefits ensuing from the present invention over conventional comfort control systems.
Figure 3:
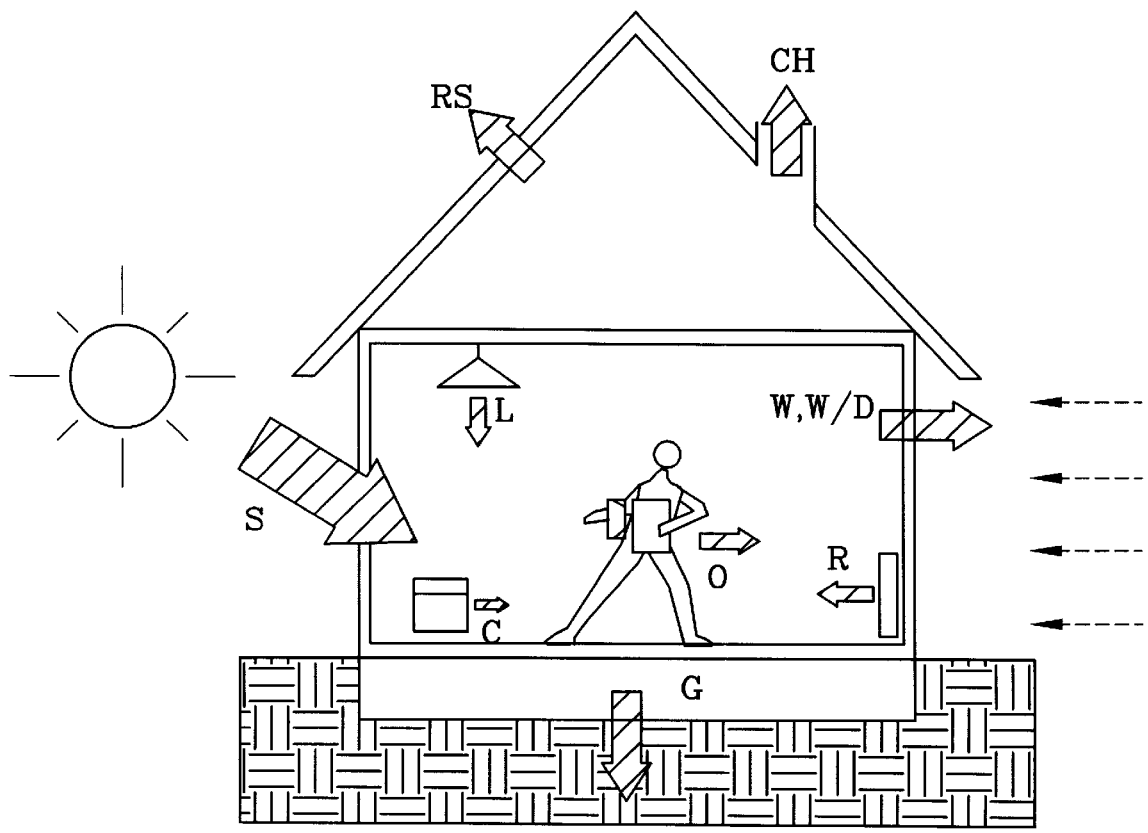
FIG. 3 is a schematic drawings showing heat losses considered for one of a number of types of buildings.

In FIG. 1, there is shown a station (generally designated as 1) for a buildings management provider who is responsible for providing buildings management services (including optimised and efficient operation of HVAC systems) for a number of clients A, B and C who have respective buildings A1, A2, B1, B2, C1, C2 (buildings B1, B2, C1, C2 omitted from FIG. 1 for simplicity).

A weather forecast unit 2 provides appropriate weather forecast data (hereinafter referred to as WF) for an immediately ensuing period and inputs WF into an "equivalent temperature" generator 3 which processes the data according to its effect on each of type of building, each type having a pre-determined set of features, the resulting data being henceforth referred to as the "equivalent temperature" (ET) data.

The WF data from unit 2 and the ET data from generator 3 is then transmitted over the Internet (and/or can be broadcast in other ways, e.g. by radio-frequency transmission, and/or can be sent over dedicated hardwire links) for reception (e.g. limited by pre-determined subscription) at station 1.

Station 1 has a buildings database 4 which contains, for each building (A1, A2, B1, B2, C1, C2) handled by the buildings management provider, a very large amount of information with appropriate details about that building, particularly the external-building characteristics, and including:

i. the height of the building;

ii. the cross-sectional profile of the building from each of a plurality of directions relative to the building;

iii. the exterior cross-sectional shape of the building;

iv. the flow/drag characteristics over the exterior of the building for each of a number of directions of flow, both in horizontal planes at a number of heights from the ground and in non-horizontal planes;

v. the degree of shelter afforded by adjacent buildings or other structures relative to each of a plurality of directions of approach to the building;

vi. the degree of shelter or exposure afforded by the surrounding land-mass relative to each of a plurality of directions of approach to the building.

The WF and ET data is processed with respective buildings data from database 4 at compiler 5 to produce instructions signals (hereinafter referred to as IS) for onward transmission (in any appropriate manner, for example, any of the ways hereinbefore described) by instructions distributor 6 to the interface unit 7A,7B,7C for the respective clients, A,B,C.

Station 1 includes a store 8 to hold historic information on the WF and ET data, and also a costing unit 9 to handle appropriate charging to the respective clients A, B, C.

At each client interface unit 7A,7B,7C, the respective signals ISA, ISB, ISC are checked to ensure they are intended for that client by reference to the database 10A, 10B, 10C which contains buildings information only for those buildings belonging to that client. Thereafter, the signal ISA is passed to distributor unit 11A which sends only the instruction signals ISA1 to building A1, only the instruction signal ISA2 to building A2, and so on.

At building A1 management control system 12A, signal ISA1 undergoes a further check operation by reference to data store 13A which holds information only on building A1; once cleared, signal ISA1 is used in system 12A to operate heating system controller 14A, cooling system controller 15A and ventilating system controller 16A.

Each of the controllers 14A, 15A and 16A operates individually and in combination in order to maximise benefit of the predictive elements of the WF data. Thus, each and all controllers operate pro-actively to anticipate changes in the weather and the resultant effects internal and external to each building, taking account of the particular circumstances of the specific building; the controllers operate in accordance with those changes which will occur (e.g. day-night cycling) or which are predicted to occur, over a forth-coming 5-day term, the WF data being updated hourly in view of prevailing and intervening weather conditions. In this way, the controllers are able to provide optimised operation in a variety of ways which may not readily be achieved by conventional systems, for example:

Night cooling:

The fans and ventilation system in the building can be used at night-time to cool the building's thermal mass if it is predicted that the coming day will be hot and sunny. With this function, energy in the day-time is saved because the cooling machines have shorter operating time as coolness is stored in the building.

Cooling equipment:

If it is a hot day, and the cooling equipment is used to reach a good indoor climate, the controllers can calculate the energy needs in the forthcoming night. If there is a heating requirement for the night, the cooling equipment is stopped earlier in the day in order to store heat in the thermal mass of the building. This function saves energy which would otherwise be expended on the cooling operation during the day.

Sun screening system

By connecting the sun screening system with the heating system, heating is saved in the night by earlier letting in the sun's radiation and warm up the rooms and also the thermal mass in the building every day that there is a heating need in the following night. This function stores heating the day which then is used in the next night as free energy.

Heating and cooling system:

In the Spring, typically there are hot days which follow very cold nights. With forecast controlling, the most optimised way is calculated to reach the best indoor climate and use as much as possible of free energy from the sun. This function saves both heating and cooling energy.

Production of the ET data by generator 3 employs analysis of the major significant energy inputs and outputs for a variety of predetermined types of building covering a wide range of situations, e.g. domestic houses, commercial premises, industrial premises, factories, hospitals, institutions, universities, schools. Examples of energy inputs are:

i. radiant sunlight (S);
ii. radiators (R) in heating systems;
iii. lighting (L);
iv. Cooling (facility) (C);
v. Occupants (O).

Examples of energy outputs are:

i. losses through walls (W);
ii. losses from windows/doors (W/D), including when closed and when temporarily open:
iii. losses to the ground (G);
iv. losses through roof space (RS);
v. losses through chimneys (CH) etc providing permanent access to the exterior.

The overall energy requirement for a given type of building at a given time depends on a combination of all the energy input/output factors appropriate to that type of building and to the weather conditions at that time. The ET data is generated by any one of a number of energy balance models, available on the market or apparent to a skilled person, for example the ENLOSS model provided by SMHI of Sweden; input of WF data into any such model typically includes the following:

i. Outdoor temperature (° C.)
ii. Sunlight (W/m$^2$);
iii. Wind speed (m/s);
iv. Wind direction (0–360°).

One way of calculating ET is as follows:

$$ET = K_1(G) + K_2(CH) + K_3(RS) + K_4(W) + K_5(W/D) + K_6(C) - K_7(S) - K_8(O) - K_9(L) - K_{10}(R)$$

where the K values are constants chosen by the designer and may take into account the height of the building, the cross-sectional profile of the building from each of a plurality of directions relative to the building, the exterior cross-sectional shape of the building, the flow/drag characteristics over the exterior of the building for each of a number of directions of flow, both in horizontal planes at a number of heights from the ground and in non-horizontal planes, the degree of shelter afforded by adjacent buildings or other structures relative to each of a plurality of directions of approach to the building and/or the degree of shelter or exposure afforded by the surrounding land-mass relative to each of a plurality of directions of approach to the building.

In a cooling season, the K10 constant would be set equal to zero while in a heating season, the K6 constant would be set to zero.

The energy requirement, Q, is given by:

$$Q = k \cdot (T_1 - ET)$$

where $T_1$ is the interior temperature, and k is a constant.

In analysis of comfort controls, outdoor temperature is not the only factor which determines the energy requirement for heating a building-solar radiation and wind also play important roles. The fact that a house heats up when the sun shines in through the window, or loses heat when it is very windy, is well known. However, typically the assumption is made that the heating requirement is proportional to the temperature difference between inside and outside which forms the basis for the so-called "degree days" which for many years have been used as a basis for energy follow-up.

In fact the energy requirement for heating does not follow a linear function of the outdoor temperature. As a rule, the colder it is, the less the wind, while cold days often have less cloud and more sun than milder and windy days. The rate of increase in the heating requirement therefore diminishes with falling temperatures.

Control systems take into consideration the curvature of the curve by using step-by-step linear control curves within different temperature intervals or during different parts of the year. However, controlling the heat according to step-by-step linear curves may imply certain problems.

Assume that the heating system adjusts in to a certain outdoor temperature in order to achieve the required indoor temperature. Irrespective of at which temperature this takes place, the system will temporarily supply too much energy at each other temperature if the control system is based on a "tangential direction". Each change of weather therefore implies a "waste" of energy. It is not uncommon for a refrigeration plant to switch on to get rid of surplus heat, so that expensive energy is used to get rid of "free energy". A measure of the collective effects of temperature, sun and wind, has been obtained by providing a calculation model for weather related energy requirements in buildings.

The ET data takes into consideration the outdoor temperature, solar radiation and wind.

In a variant to the illustrated embodiment, ET generator 3 may make use of external-building characteristics, and/or the buildings data base 4 may include ET data.

By use of the present invention, energy of savings of up to 10 to 20%, as compared to conventional systems, are readily achieved.

What is claimed is:

1. A comfort controls system for at least one building, the system comprising:

means to receive weather forecast data, means to combine said data with a group of external-building characteristics relating to at least one specific building to derive instructions signals for comfort controls operation of said at least one specific building;

means to direct said instructing signals to the building management control means for the appropriate specific building(s).

2. A system according to claim 1, wherein the external-building characteristics includes at least one of the following parameters:
  i. the height of the building;
  ii. the cross-sectional profile of the building from each of a plurality of directions relative to the building;
  iii. the exterior cross-sectional shape of the building;
  iv. the flow/drag characteristics over the exterior of the building for each of a number of directions of flow, both in horizontal planes at a number of heights from the ground and in non-horizontal planes;
  v. the degree of shelter afforded by adjacent buildings or other structures relative to each of a plurality of directions of approach to the building:
  vi. the degree of shelter or exposure afforded by the surrounding land-mass relative to each of a plurality of directions of approach to the building.

3. A system according to claim 1, incorporating means to receive the weather forecasting data in one of the following formats:
  i. signals transmitted over the Internet
  ii. radio-transmitted signals
  iii. signals transferred over a hard-wire network.

4. A system according to claim 1, incorporating means to transfer said instructing signals to said buildings management control means in one of the following formats:
  i. signals transmitted over the Internet
  ii. radio-transmitted signals
  iii. signals transferred over a hard-wire network.

5. A system according to claim 1, wherein the building management control means comprises a heating controller which operates the heating functions in accordance with said weather forecast data received in order to optimise the interior temperature while maximising use of the radiant input energy.

6. A system according to claim 1, wherein the building management control means comprises a cooling controller which operates the cooling functions in accordance with said weather forecast data in order to optimise the storage of thermal means in the building.

7. A system according to claim 1, wherein the building management control means comprises a ventilation controller which operates the ventilation functions in accordance with said weather forecast data in order to optimise the heating or cooling requirements of the building.

8. A system according to claim 1 comprising means to check that the instructing signals received at the building management control means include data for the respective building.

9. A system according to claim 8 wherein the check means comprises means to compare the building characteristics contained in the instructions signal with a store containing building parameters for that specific building.

10. A comfort controls system for a plurality of buildings, the system comprising:
  means to receive weather forecast data,
  means to combine said data with a group of external-building characteristics for each of a plurality of specific buildings to derive instructions signals for comfort controls operation of the respective specific buildings;
  means to direct said instructing signals to the building management control means for each of said appropriate specific buildings.

11. A method of operating a comfort controls system for at least one building, the method comprising:
  receiving weather forecast data,
  combining said data with a group of external-building characteristics relating to at least one specific building to derive instructions signals for comfort controls operation of said at least one specific building;
  directing said instructing signals to the building management control means for the appropriate specific building(s).

12. A method according to claim 11, wherein the external-building characteristics includes at least one of the following parameters:
  i. the height of the building;
  ii. the cross-sectional profile of the building from each of a plurality of directions relative to the building;
  iii. the exterior cross-sectional shape of the building;
  iv. the flow/drag characteristics over the exterior of the building for each of a number of directions of flow, both in horizontal planes at a number of heights from the ground and in non-horizontal planes;
  v. the degree of shelter afforded by adjacent buildings or other structures relative to each of a plurality of directions of approach to the building:
  vi. the degree of shelter or exposure afforded by the surrounding land-mass relative to each of a plurality of directions of approach to the building.

13. A method according to claim 11, comprising receiving the weather forecasting data in one of the following formats:
  i. signals transmitted over the Internet;
  ii. radio-transmitted signals;
  iii. signals transferred over a hard-wire network.

14. A method according to claim 11, comprising transferring said instructing signals to said buildings management control means in one of the following formats:
  i. signals transmitted over the Internet;
  ii. radio-transmitted signals;
  iii. signals transferred over a hard-wire network.

15. A method according to claim 11, comprising operating the heating functions in accordance with said weather forecast data received in order to optimise the interior temperature while maximising use of the radiant input energy.

16. A method according to claim 11, comprising operating the cooling functions in accordance with said weather forecast data in order to optimise the storage of thermal means in the building.

17. A method according to claim 11, comprising operating the ventilation functions in accordance with said weather forecast data in order to optimise the heating or cooling requirements of the building.

18. A method according to claim 11 comprising checking that the instructing signals received at the building management control means include data for the respective building.

19. A method according to claim 18 wherein the checking step comprises comparing the building characteristics contained in the instructions signal with a store containing building parameters for that specific building.

20. A computer program product stored on a computer usable medium, comprising:
  computer readable program means for causing a computer to receive weather forecast data;
  computer readable program means for causing the computer to combine said data into a group of external-building characteristics relating to at least one specific building to derive instructions signals for comfort controls operation of said at least one specific building; and
  computer readable program means for causing the computer to direct said instructions signals to the building management control means for the appropriate specific building(s).

* * * * *